United States Patent [19]

Zetena

[11] Patent Number: 4,558,172

[45] Date of Patent: Dec. 10, 1985

[54] WALL RECESS CABLE CONNECTOR PERMITTING SIMPLIFIED INNERCONNECTION AND LIMITING PROTRUDING CABLES

[76] Inventor: Maurice F. Zetena, 31 Lampost Dr., West Redding, Conn. 06876

[21] Appl. No.: 521,448

[22] Filed: Aug. 8, 1983

[51] Int. Cl.[4] .............................................. H02G 3/14

[52] U.S. Cl. ...................................... 174/66; 339/123

[58] Field of Search .................................. 174/66, 67; 220/3.2-3.94, 241, 242; 339/123; 200/51.03, 51.04, 51.05, 296

[56] References Cited

U.S. PATENT DOCUMENTS

| | | | |
|---|---|---|---|
| 2,634,340 | 4/1953 | Batcheller | 200/296 X |
| 3,341,268 | 9/1967 | Bickford | 174/38 X |
| 3,636,236 | 1/1972 | Smith | 174/66 |
| 3,652,781 | 3/1972 | Robbins | 174/67 |
| 4,059,327 | 11/1977 | Vann | 174/66 X |

*Primary Examiner*—A. T. Grimley
*Assistant Examiner*—D. A. Tone
*Attorney, Agent, or Firm*—Haynes N. Johnson

[57] ABSTRACT

A flush type wall mounted coaxial connector assembly is provided for interconnection of coaxial cables. The assembly uses a recessed wall plate having at least one internal side which is at an obtuse angle to the surface and carrying a coaxial cable connector. As a result, the cable interconnection will be behind the wall surface and the extending coaxial cable will run substantially parallel to the wall surface and not intrude excessively into the room.

3 Claims, 6 Drawing Figures

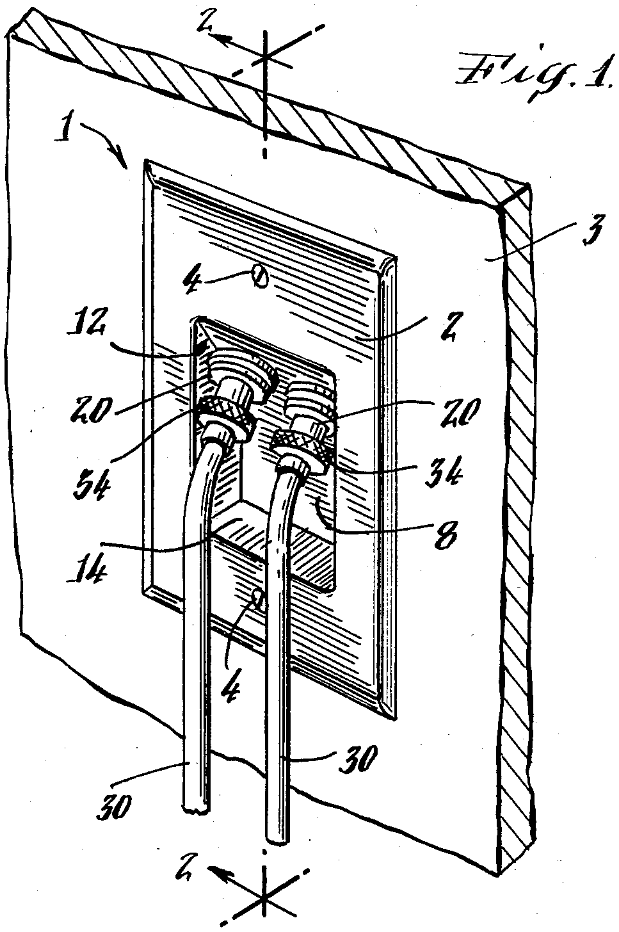
Fig. 1.
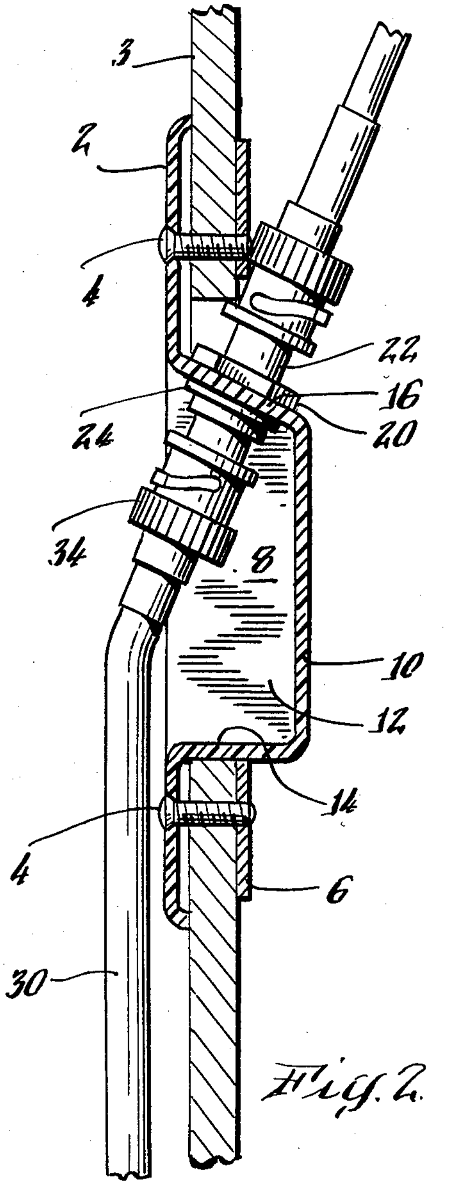
Fig. 2.
Fig. 3.
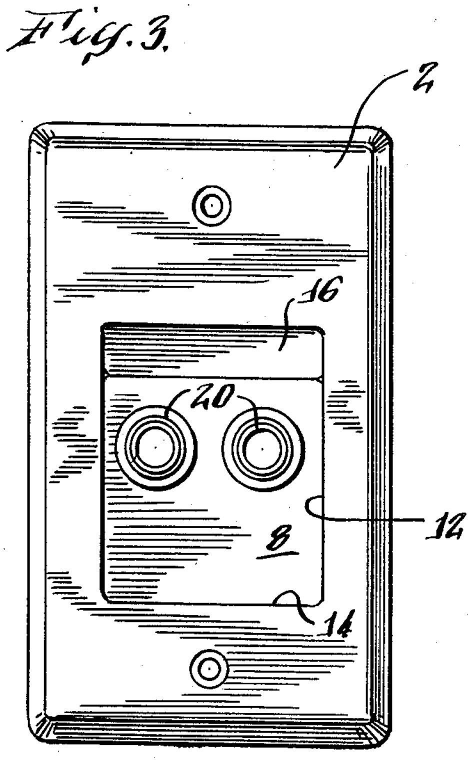
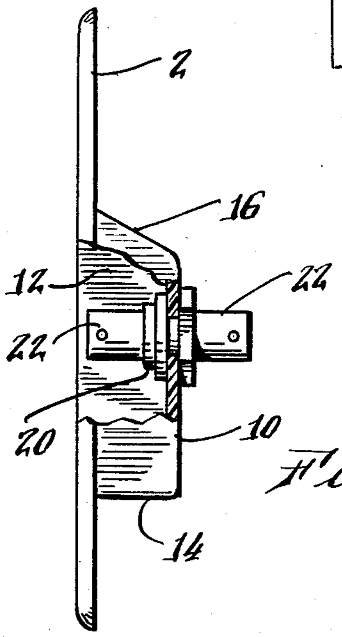
Fig. 4.

WALL RECESS CABLE CONNECTOR PERMITTING SIMPLIFIED INNERCONNECTION AND LIMITING PROTRUDING CABLES

BACKGROUND OF THE INVENTION

This invention relates to wiring for data transmission, such as between a terminal and a computer central processing unit, between terminals, or between two or more central processing units of a computer. For this purpose it is desirable to have the coaxial cable used for the interconnections run within the walls and to have outlets in different rooms or offices.

In the past such wall interconnections have used standard BNC coaxial cable connectors. The connectors are normally mounted in a flat plate which is flush with the wall, and the coaxial connector extends perpendicularly into the room, interfering with placement of desks or other furniture.

Another form of prior connector plate provides for recessing the connector bushing. However, the recessed area is only adequate to receive the coaxial cable and, consequently, not only does the cable protrude directly into the room, but it is difficult to grasp for connection and disconnection with the usual bayonet-type connector bushing.

SUMMARY OF THE INVENTION

By contrast, the assembly of the present invention allows for recessed interconnection, for essentially flush mounting, and for easy connection and disconnection. Perhaps most importantly, it permits the coaxial cable to leave the connection area essentially flush with the wall and not protruding so as to interfere with furniture.

This result is accomplished by providing a flush-type, wall-mounted coaxial connector assembly made up of a wall plate with an inwardly recessed chamber to receive and interconnect the cables. The recessed chamber is of sufficient size to permit finger access for connecting and disconnecting the cable and is deep and wide enough so that the cable may bend and be essentially flush with the wall by the time it leaves the recessed chamber. Preferably, the connector itself is not on the back wall of the recess chamber, but is on one of the side walls; and the side wall is at such an angle as to permit the cable to readily flex sufficiently so that it leaves the recess essentially flush with the wall. A side wall at a slightly obtuse angle relative to the base plate is best.

If desired, the recessed chamber may provide for more than one coaxial cable connector. It may also include a single external connector and a multiposition lockout switch within the recessed chamber for interconnecting that cable with any desired other cable.

THE DRAWINGS

FIG. 1 is a perspective view of the wall mounting assembly showing two connectors located on one angularly positioned side wall of its chamber and showing two coaxial cables extending from the chamber substantially parallel to the wall surface.

FIG. 2 is a section on line 2—2 of FIG. 1 showing the interconnection of one cable with a coaxial cable running within the walls of the building. It should be noted that the cable running within the room is proximate to and parallel with the wall.

FIG. 3 is a front elevation of a modification of the invention in which two connectors are mounted on the back wall of the recessed chamber.

FIG. 4 is a side elevation, partially broken away, of the assembly of FIG. 3.

DESCRIPTION OF INVENTION

Figure 5:
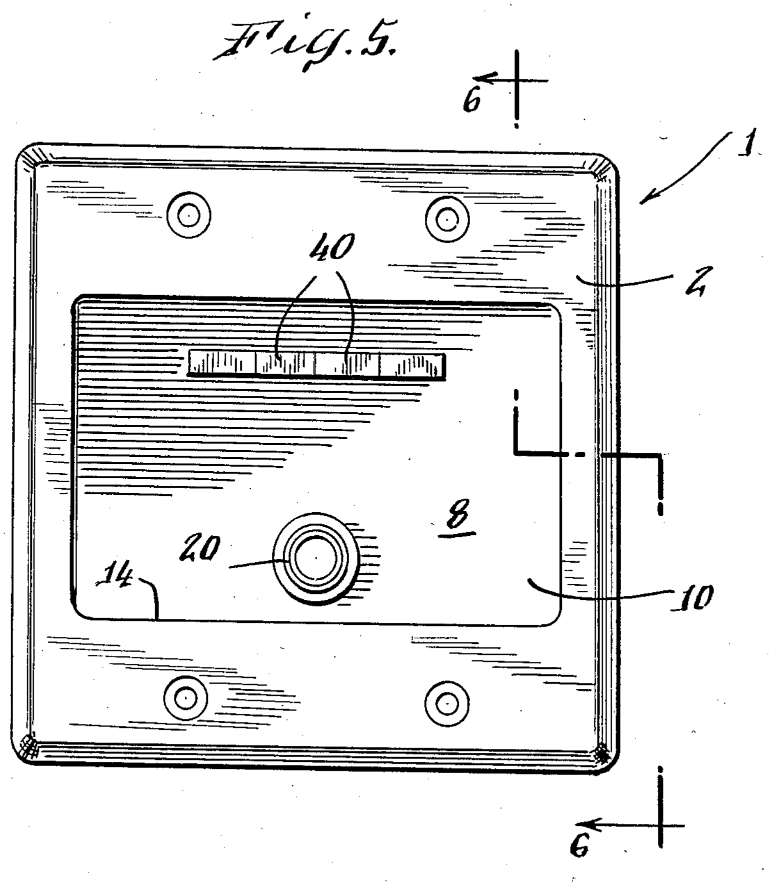
FIG. 5 is a further modification of the unit using a single connector and a multi-position push button lockout switch, allowing the user to elect which incoming coaxial cable will be used.

The drawings show various forms of my flush-type, wall-mounted connector assembly for interconnection of the coaxial cables of small office computers and the like with coaxial cables prewired within the walls of a building.

The assembly 1 includes a face plate 2 and, as shown, is secured to office wall 3 with bolts or screws 4.

Assembly 1 is integrally molded to form face plate 2 and recessed chamber 8, the preferred material being ABS fire retardant plastic. The recessed chamber 8 is generally centered in the assembly.

Recessed chamber 8 includes back wall 10, side walls 12, bottom wall 14, and top wall 16. Preferably, back wall 10 is recessed from but parallel to face plate 2. Side walls 12 and bottom wall 14 are perpendicular to face plate 2, and top wall 16 is at an obtuse angle with respect to face plate 14.

Angular top wall 16 is formed with one or more holes to receive coaxial connectors. FIGS. 1 and 2 show two coaxial connectors 20 utilizing, in this instance, bayonet type mounts. The connectors are made up of standard hardware which includes two jacks 22, a bushing 24 and a securing nut 26 (note also FIG. 4.)

Assembly 1 is preferably secured to the wall by having bolt 4 pass through the wall and be threaded to mounting plate 6 (FIG. 2.)

The connected coaxial cables 30 enter the room and lead to the terminal or other unit being used. They are connected through coaxial connectors 22 to the coaxial cables 32 running inside the walls.

Several parameters should be considered in the design and dimensions of recessed chamber 8 and of the angle of whichever chamber wall is set an an angle (as, for example, in the present disclosure, top wall 16.) First of all there must be adequate room to receive the connectors 20 and the female connectors 34 on the coaxial cables 30. In addition, there should be sufficient space within recessed chamber 8 to permit one to grasp connector 34 to connect it or disconnect it from the unit. Coaxial cable 30 is normally 93 ohm (RG 62/U) or 75 ohm (RG 59/U) which, though it will flex and bend, has limits upon the extent to which it can bend. Accordingly, the angle of top wall 16 relative to the depth of recessed chamber 8 and the distance between top wall 16 and bottom wall 14 should be such that the connected cable has room to flex sufficiently to leave chamber 8 running substantially parallel with and contiguous to wall 3. (As shown for example in FIGS. 1 and 2.) Similarly, the depth of the recessed chamber is limited due to the limitation of internal wall space.

Typical dimensions for a dual recessed assembly unit would include a face plate measuring 2.75 by 4.50 inches with an opening of $1\frac{5}{8}$ by 2 inches and bottom and side walls with a depth of $\frac{5}{8}$ inches. The assembly itself is approximately $\frac{1}{8}$ inch thick. The back wall would be (internally) about $1\frac{3}{4}$ inch long with the top wall dimensioned accordingly and at an angle to the face plate of approximately 120 degrees. With this dimensioning and the use of a standard jack, the outer edge of the jack itself would be approximately flush with the plane of face plate 2, thus permitting coaxial cable 30, when connected, to flex sufficiently to be proximate to and parallel with the wall 3.

Accordingly, it can be seen that I have provided a flush type, wall mounted, coaxial connector assembly for interconnection of coaxial cables of units such as small office computers with coaxial cables within walls. This assembly includes a wall plate having an inwardly recessed chamber 8 for receiving and interconnecting coaxial cable 30 located within the room with coaxial cables 32 located within the wall; and the chamber 8 includes side walls 12, back wall 10, bottom wall 14 and top wall 16. These walls define a chamber space adequate to hold a coaxial connector 20 entirely within the recessed chamber 8 and to permit finger access for attaching cable 30 by use of its connector 34; and connector unit 20 is mounted in one of the walls of the recess so that the coaxial cables 30 can be readily connected and disconnected within the assembly without the connector extending beyond the assembly's outer surface.

FIGS. 3 and 4 disclose a modification of my coaxial connector assembly. In this modification coaxial connector 20 is secured to and passes through the back wall 10 of the recessed chamber 8. Its outer end is within chamber 8 providing for a recessed fixture, but is not on an angular wall such as top wall 16. This provides the convenience of a recessed fixture with space for finger access for connection and disconnection. Since the connector is recessed from the plane of the face plate 2, the cable will not project into the room to the extent normally found in such structures, but it is not as effective in providing a path for coaxial cable 30 immediately proximate to the office wall 3 as is the former modification.

Figure 6:
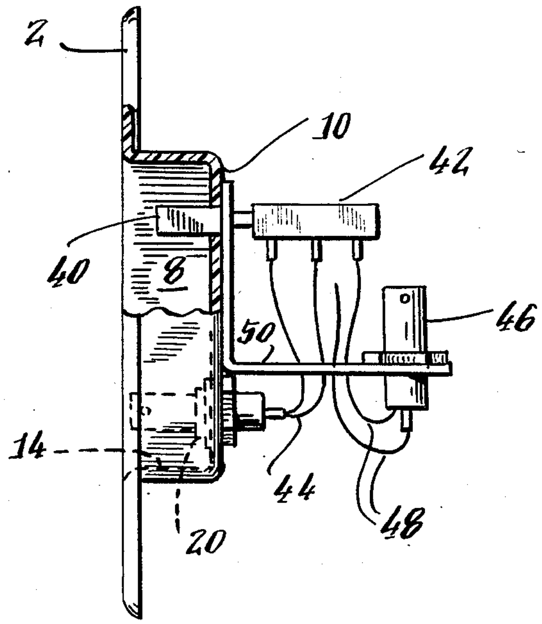
FIG. 6 is a section on line 6—6 of FIG. 5.

FIGS. 5 and 6 disclose a further modification adapted to permit a single coaxial cable to be interconnected with various coaxial cables within the wall. In this instance, the assembly is somewhat wider, with face plate 2 including a recessed chamber 8 of rectangular cross section. Chamber 8 includes a single connector 20 mounted on bottom wall 14 and uses a multiposition lock-out switch 42 to interconnect connector 20 with the desired one of a series of coaxial cables 46 within the wall. The actuating buttons 40 for switch 42 project through the bottom wall 14 and so are accessible to the user. Connectors 46 for the various internal coaxial cables are held by a mounting bracket 50 secured to the back of the recessed chamber. Switch 42 is connected with connector 20 through leads 44 and with internal connectors 46 through leads 48. Thus, when coaxial cables are secured to connectors 46, they may be individually connected to the office coaxial cable attached to connector 20 by actuation of the various buttons 40 of switch 42. This structure avoids the necessity of more than a single cable coming from the wall into the office area, but at the same time permits utilization of one of a multiple of internally wired cables.

I claim:

1. A flush-type, connector assembly for interconnecting coaxial cables of office apparatus with pre-wired, interior wall coaxial cables, said assembly including a wall plate adapted for mounting over an opening in a building wall, and mounting means therefor, said wall plate including one inwardly-extending recessed chamber having top, bottom, side and back walls, with at least one of said top, bottom, or side walls being at an obtuse angle to the plane of said wall plate, a coaxial connector mounted on and through said last-named wall, said connector being adapted to interconnect with coaxial cables on each side of said last-named wall, said obtuse angle being such relative to the dimensions of said chamber and the location of said connector on its said wall as to allow said coaxial cable on the chamber side of said plate to pass out of said recess and lie proximate to and substantially parallel to said building wall, whereby furniture may be placed close to said wall without interference from said cable.

2. An assembly as set forth in claim 1 and including a plurality of said connectors mounted on and through said wall having said obtuse angle.

3. A flush type, wall mounted, connector assembly for interconnection of coaxial cables for devices such as small office computers with coaxial cables within structural walls, said assembly including, a wall plate having an outer surface and an inwardly recessed chamber for receiving and interconnecting said coaxial cables, said recessed chamber including sides and a back defining a space adequate to hold a coaxial connector entirely within said chamber and to permit finger access for rotatably attaching a said coaxial cable to a said coaxial connector, a coaxial connector mounted on one of said sides, said mounting side being at an obtuse angle relative to said outer surface, and said angle being such as to permit a connected coaxial cable to pass out of said chamber and be positioned proximate to said outer surface of said wall plate, and means for mounting said assembly in a wall opening, whereby coaxial cables may be readily connected and disconnected within said wall assembly, said connector will not extend beyond said outer surface, and furniture may be placed close to said wall without interference with said cable.

* * * * *